Patented Jan. 6, 1948

2,434,129

UNITED STATES PATENT OFFICE 2,434,129

VULCANIZING BUTADIENE POLYMERS

Monte C. Throdahl, Nitro, W. Va., assignor to Monsanto Chemical Company, St. Louis, Mo., a corporation of Delaware No Drawing. Application January 17, 1945, Serial No. 573,316

18 Claims. (Cl. 260—84.5)

1

The present invention relates to a process for vulcanizing synthetic rubber-like masses from polymerizable butadiene compounds and organic nitriles and to the vulcanized products so obtained.

While the copolymers of butadiene-1,3 compounds and organic nitriles are amenable to ordinary sulfur vulcanization just as is natural rubber, some undesirable properties exhibited by the vulcanizates have been attributed to the presence of sulfur. Other methods of vulcanization have been sought which would dispense with the use of sulfur with the expectancy that the cured products would avoid the shortcomings of sulfur vulcanizates. This expectancy is borne out by the present invention which provides vulcanized products superior to products vulcanized with sulfur.

In accordance with the present invention it has been discovered that sulfur vulcanizable copolymers of butadiene-1,3 compounds and organic nitriles may be vulcanized without sulfur by heating in the presence of metallic halides. A wide variety of halides are suitable. In general it has been found that halides of elements of the iron subgroup manganese, and metal halides of elements of subgroups (b) of groups 1 to 6 inclusive of the periodic arrangement of the elements are suitable. By subgroups of metals are meant the divisions followed by Roscoe and Schorlemmer in their book, "A Treatise on Chemistry," vol. II, 6th edition. Metallic halides of metals above mercury but below the alkaline earths in the electromotive series possess marked vulcanizing activity. The amount to be used will vary widely depending upon the particular composition and conditions under which it is to be used. In general amounts of 2–10 percent by weight on the polymer cover the most satisfactory proportions.

The following are specific embodiments of the invention and are to be understood as illustrative of the invention but not limitative thereof.

Stocks were compounded comprising

| Stock | A | B | C | D | E |
|---|---|---|---|---|---|
| | Parts by weight | Parts by weight | Parts by weight | Parts by weight | Parts by weight |
| Copolymer of butadiene-1,3 and acrylic nitrile | 100 | 100 | 100 | 100 | 100 |
| Carbon black | 60 | 60 | 60 | 60 | 60 |
| Dibutyl phthalate | 20 | 20 | 20 | 20 | 20 |
| Zinc oxide | 5 | 5 | 5 | 5 | 5 |
| Stearic acid | 1.5 | 1.5 | 1.5 | 1.5 | 1.5 |
| N-Cyclohexyl 2-benzothiazole sulfenamide | 0.75 | 0.75 | 0.75 | 0.75 | 0.75 |
| Butylaldehyde-aniline | 0.75 | 0.75 | 0.75 | 0.75 | 0.75 |
| Sulfur | 1.5 | | | | |
| Zinc chloride | | 2 | 4 | 7 | 10 |

2

The stocks so compounded were cured by heating in the usual manner in a press at 292° F. and then artificially aged by heating in a circulating air oven for 24 hours at 250° F. The modulus and tensile properties of the cured products, both aged and unaged, are set forth below.

Table I

| Stock | Cure Time in Mins. | Modulus of Elasticity in lbs./in.² at Elongations of— | | Tensile at Break in lbs./in.² | Ultimate Elongation, Per Cent |
|---|---|---|---|---|---|
| | | 300% | 500% | | |
| A | 30 | 1,290 | | 1,520 | 400 |
| B | 30 | 220 | 352 | 581 | 975 |
| C | 30 | 480 | 800 | 1,640 | 930 |
| D | 30 | 786 | 1,350 | 2,260 | 780 |
| E | 30 | 890 | 1,555 | 2,405 | 700 |
| A | 60 | 1,560 | | 1,625 | 315 |
| B | 60 | 318 | 560 | 1,120 | 1,000 |
| C | 60 | 710 | 1,190 | 2,170 | 820 |
| D | 60 | 930 | 1,540 | 2,420 | 760 |
| E | 60 | 1,040 | 1,750 | 2,500 | 700 |
| Aged | | | | | |
| A | 30 | | | 1,708 | 140 |
| B | 30 | 2,000 | | 2,490 | 480 |
| C | 30 | 2,290 | | 2,670 | 465 |
| D | 30 | 2,695 | | 2,835 | 400 |
| E | 30 | | | 2,785 | 255 |
| A | 60 | | | 1,820 | 155 |
| B | 60 | 1,860 | | 2,435 | 480 |
| C | 60 | 2,040 | | 2,600 | 490 |
| D | 60 | 2,690 | | 2,850 | 365 |
| E | 60 | 3,090 | | 3,105 | 305 |

The above data show that in the absence of sulfur the physical properties of the stocks increase with increasing amounts of zinc chloride. After aging the stocks containing zinc chloride show very much higher elongation and tensile strength than the sulfur vulcanizate.

A stock was compounded comprising

Stock F, parts by weight
Copolymer of butadiene-1,3 and acrylic nitrile _____ 100
Carbon black _____ 60
Dibutyl phthalate _____ 20
Zinc oxide _____ 5
Stearic acid _____ 1.5
N-cyclohexyl 2-benzothiazole sulfenamide _____ 0.75
Butyraldehyde-aniline _____ 0.75
Ferric chloride _____ 4

The stock so compounded was vulcanized by heating in a press at 292° F. and artificially aged by heating in a circulating air oven for 24 hours at 250° F.

Table II

| Stock | Cure Time in Mins. | | Modulus of Elasticity in lbs./in.² at Elongations of— | | Tensile at Break in lbs./in.² | Ult. Elong., Per Cent |
|---|---|---|---|---|---|---|
| | | | 300% | 500% | | |
| F | 60 | Unaged | 416 | 710 | 1,250 | 910 |
| F | 60 | Aged | 2,075 | | 2,590 | 500 |
| F | 90 | Unaged | 464 | 780 | 1,300 | 920 |
| F | 90 | Aged | 2,140 | | 2,595 | 485 |

These data again show that the stocks vulcanized with inorganic chlorides are highly resistant to the deteriorating effects of heat and air or oxygen.

Stocks were compounded comprising

| Stock | G | H | J | K |
|---|---|---|---|---|
| | Parts by weight | Parts by weight | Parts by weight | Parts by weight |
| Copolymer of butadiene-1,3 and acrylic nitrile | 100 | 100 | 100 | 100 |
| Carbon black | 50 | 50 | 50 | 50 |
| CoCl₂ | 5 | | | |
| SbCl₃ | | 5 | | |
| CdCl₂ | | | 5 | |
| ZnCl₂ | | | | 5 |

The stocks so compounded were cured by heating in the usual manner in a press for 90 minutes at 302° F. Good cures were obtained in each case. As indicative of cure as well as the resiliency of the stocks the relative hysteresis loss was determined by dropping a steel ball on a thin slab of the vulcanizate and measuring the rebound. Relative hysteresis loss, being equivalent to $$\frac{H-H'}{H}$$

was then calculated from this relationship where H is the height from which the ball was dropped and H' is the height to which it returned. Similar determinations were made on a sulfur control stock consisting of Sulfur control stock, parts by weight
Copolymer of butadiene-1,3 and acrylic nitrile _____ 100
Carbon black _____ 50
Zinc oxide _____ 5
Stearic acid _____ 1
Antioxidant _____ 1
2,2' dithio bis benzothiazole _____ 1.5
Sulfur _____ 1.5

This stock was also cured by heating in a press for 90 minutes at 302° F. Relative hysteresis loss are set forth in the table below.

| Stock | Relative Hysteresis Loss |
|---|---|
| | Per Cent |
| Sulfur Control | 92 |
| G | 78 |
| H | 76 |
| J | 72 |
| K | 85 |

Stocks were compounded comprising

| Stock | L | M | N | P | R | S |
|---|---|---|---|---|---|---|
| | Parts by weight | Parts by weight | Parts by weight | Parts by weight | Parts by weight | Parts by weight |
| Copolymer of butadiene-1,3 and acrylic nitrile | 100 | 100 | 100 | 100 | 100 | 100 |
| Carbon black | 50 | 50 | 50 | 50 | 50 | 50 |
| Zinc oxide | 3 | 3 | 3 | 3 | 3 | 3 |
| CuCl₂ | 5 | | | | | |
| MgCl₂ | | 5 | | | | |
| CrCl₃ | | | 5 | | | |
| MnCl₂ | | | | 5 | | |
| PbBr₂ | | | | | 5 | |
| CdCl₂ | | | | | | 5 |

These stocks were cured by heating for 90 minutes in a press at 302° F. Good cures were obtained in each case. The relative hysteresis loss was determined on the cured products as described above, the figure on the sulfur control stock being repeated for comparison.

| Stock | Relative Hysteresis Loss |
|---|---|
| | Per Cent |
| Sulfur control stock | 92 |
| L | 92 |
| M | 88 |
| N | 83 |
| P | 81 |
| R | 72 |
| S | 67 |

While many specific embodiments of the invention have been described, it is at once apparent that many other variations can be made without departing from the spirit and scope of this invention. Other metal halides may be used with varying results. Other copolymers may be used as for example, copolymers of isoprene and dimethyl butadiene with polymerizable nitriles. Typical examples of the latter include methacrylonitrile, bromacrylonitrile, alpha methyl beta brom acrylonitrile, ethyl beta cyanocrotonate, alpha phenyl acrylonitrile and alpha chlor acrylonitrile. Other pigments and compounding agents may be used in stocks containing the new vulcanizing agents. A vulcanization accelerator may be left out altogether or any of the accelerators of vulcanization effective with sulfur vulcanization may be employed. Zinc oxide mentioned in most of the formulations may be replaced by other metallic oxides as for example litharge, or used in conjunction therewith.

The present invention is not limited except as defined by the claims attached hereto as part of the present specification.

What is claimed is:

1. The process of vulcanizing a sulfur vulcanizable copolymer of a butadiene-1,3 hydrocarbon and an organic nitrile copolymerizable therewith which comprises heating in the absence of sulfur the copolymer having incorporated therein 2–10 percent by weight on the copolymer of a halide of a metal selected from the group consisting of chlorides and bromides of metals of the iron subgroup, manganese, and subgroups (b) of groups 1 to 6 inclusive of the periodic arrangement of elements.

2. The process of vulcanizing a sulfur vulcanizable copolymer of a butadiene-1,3 hydrocarbon and an organic nitrile copolymerizable therewith which comprises heating in the absence of sulfur the copolymer having incorporated therein 2–10 percent by weight on the copolymer of a chloride of a metal selected from the group consisting of metals of the iron subgroup, manganese, and subgroups (b) of groups 1 to 6 inclusive of the periodic arrangement of elements.

3. The process of vulcanizing a sulfur vulcanizable copolymer of a butadiene-1,3 hydrocarbon and an organic nitrile copolymerizable therewith which comprises heating in the absence of sulfur the copolymer having incorporated therein 2–10 percent by weight based on the copolymer of a chloride of a metal of group 2, subgroup (b) of the periodic arrangement of elements.

4. The process of vulcanizing a sulfur vulcanizable copolymer of a butadiene-1,3 hydrocarbon and an organic nitrile copolymerizable therewith which comprises heating in the absence of sulfur the copolymer having incorporated therein a metallic oxide and 2–10 percent by weight based on the copolymer of a chloride of a metal of group 2, subgroup (b) of the periodic arrangement of elements.

5. The process of vulcanizing a sulfur vulcanizable copolymer of butadiene-1,3 and acrylonitrile which comprises heating in the absence of sulfur the copolymer having incorporated therein zinc oxide and 2–10 percent by weight based on the copolymer of a halide of a metal selected from the group consisting of chlorides and bromides of metals of the iron subgroup, manganese, and subgroups (b) of groups 1 to 6 inclusive of the periodic arrangement of elements.

6. The process of vulcanizing a sulfur vulcanizable copolymer of butadiene-1,3 and acrylonitrile which comprises heating in the absence of sulfur the copolymer having incorporated therein zinc oxide and 2–10 percent by weight based on the copolymer of a chloride of a metal selected from the group consisting of metals of the iron subgroup, manganese, and subgroups (b) of groups 1 to 6 inclusive of the periodic arrangement of elements.

7. The process of vulcanizing a sulfur vulcanizable copolymer of butadiene-1,3 and acrylonitrile which comprises heating in the absence of sulfur the copolymer having incorporated therein a metal oxide and 2–10 percent by weight based on the copolymer of a chloride of a metal of group 2, subgroup (b) of the periodic arrangement of elements.

8. The process of vulcanizing a sulfur vulcanizable copolymer of butadiene-1,3 and acrylonitrile which comprises heating in the absence of sulfur the copolymer having incorporated therein a metal oxide and 2–10 percent by weight based on the copolymer of zinc chloride.

9. The process of vulcanizing a sulfur vulcanizable copolymer of butadiene-1,3 and acrylonitrile which comprises heating the copolymer in the absence of sulfur in the presence of 2–10 percent by weight based on the copolymer of zinc chloride.

10. The vulcanized product obtained by heating a sulfur vulcanizable copolymer of a butadiene-1,3 hydrocarbon and an organic nitrile copolymerizable therewith in the absence of sulfur having incorporated therein 2–10 percent by weight based on the copolymer of a halide of a metal selected from the group consisting of chlorides and bromides of metals of the iron subgroup, manganese, and subgroups (b) of groups 1 to 6 inclusive of the periodic arrangement of elements.

11. The vulcanized product obtained by heating a sulfur vulcanizable copolymer of a butadiene-1,3 hydrocarbon and an organic nitrile copolymerizable therewith in the absence of sulfur having incorporated therein 2–10 percent by weight based on the copolymer of a chloride of a metal selected from the group consisting of metals of the iron subgroup, manganese, and subgroups (b) of groups 1 to 6 inclusive of the periodic arrangement of elements.

12. The vulcanized product obtained by heating a sulfur vulcanizable copolymer of a butadiene-1,3 hydrocarbon and an organic nitrile copolymerizable therewith in the absence of sulfur having incorporated therein metal oxide and 2–10 percent by weight based on the copolymer of a chloride of a metal of group 2, subgroup (b) of the periodic arrangement of elements.

13. The vulcanized product obtained by heating a sulfur vulcanizable copolymer of a butadiene-1,3 hydrocarbon and an organic nitrile copolymerizable therewith in the absence of sulfur having incorporated therein zinc oxide and 2–10 percent by weight based on the copolymer of a chloride of a metal of group 2, subgroup (b) of the periodic arrangement of elements.

14. The vulcanized product obtained by heating a sulfur vulcanizable copolymer of butadiene-1,3 and acrylonitrile in the absence of sulfur having incorporated therein zinc oxide and 2–10 percent by weight based on the copolymer of a halide of a metal selected from the group consisting of chlorides and bromides of metals of the iron subgroup, manganese, and subgroups (b) of groups 1 to 6 inclusive of the periodic arrangement of elements.

15. The vulcanized product obtained by heating a sulfur vulcanizable copolymer of butadiene-1,3 and acrylonitrile in the absence of sulfur having incorporated therein zinc oxide and 2–10 percent by weight based on the copolymer of a chloride of a metal selected from the group consisting of metals of the iron subgroup, manganese, and subgroups (b) of groups 1 to 6 inclusive of the periodic arrangement of elements.

16. The vulcanized product obtained by heating a sulfur vulcanizable copolymer of butadiene-1,3 and acrylonitrile in the absence of sulfur having incorporated therein a metal oxide and 2–10 percent by weight based on the copolymer of a chloride of a metal of group 2, subgroup (b) of the periodic arrangement of elements.

17. The vulcanized product obtained by heating a sulfur vulcanizable copolymer of butadiene-1,3 and acrylonitrile in the absence of sulfur having incorporated therein zinc oxide and 2–10 percent by weight based on the copolymer of zinc chloride.

18. The vulcanized product obtained by heating a sulfur vulcanizable copolymer of butadiene-1,3 and acrylonitrile in the absence of sulfur in the presence of 2–10 percent by weight based on the copolymer of zinc chloride.

MONTE C. THRODAHL.

REFERENCES CITED

The following references are of record in the file of this patent:

UNITED STATES PATENTS

| Number | Name | Date |
|---|---|---|
| 2,395,506 | Sauser | Feb. 26, 1946 |

OTHER REFERENCES

A. P. C. application, Bachle et al., S. N. 362,608, published April 20, 1943.